(12) United States Patent
Yamauchi (10) Patent No.: US 7,748,853 B2
(45) Date of Patent: Jul. 6, 2010

(54) LIGHTING DEVICE AND PROJECTOR

(75) Inventor: Taisuke Yamauchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 653 days.

(21) Appl. No.: 11/463,948

(22) Filed: Aug. 11, 2006

(65) Prior Publication Data

US 2007/0040997 A1 Feb. 22, 2007

(30) Foreign Application Priority Data

Aug. 18, 2005 (JP) .............................. 2005-237271

(51) Int. Cl.
G03B 21/14 (2006.01)
(52) U.S. Cl. ....................................................... 353/97
(58) Field of Classification Search .................. 353/97, 353/74, 359; 359/571, 558, 562
See application file for complete search history.

(56) References Cited

U.S. PATENT DOCUMENTS

| | | | | |
|---|---|---|---|---|
| 6,466,372 | B1 * | 10/2002 | Morris et al. | 359/567 |
| 6,563,567 | B1 | 5/2003 | Komatsuda et al. | |
| 6,798,464 | B2 * | 9/2004 | Bietsch et al. | 349/12 |
| 6,903,801 | B2 | 6/2005 | Mori | |
| 6,937,378 | B2 * | 8/2005 | Yamazaki et al. | 359/244 |
| 7,271,962 | B2 * | 9/2007 | Kasazumi et al. | 359/707 |
| 2003/0156266 | A1 | 8/2003 | Tanitsu | |
| 2003/0156269 | A1 | 8/2003 | Komatsuda et al. | |
| 2003/0160949 | A1 | 8/2003 | Komatsuda et al. | |
| 2005/0078374 | A1 * | 4/2005 | Taira et al. | 359/569 |

FOREIGN PATENT DOCUMENTS

| | | |
|---|---|---|
| JP | 07-104211 A | 4/1995 |
| JP | 09-050117 A | 2/1997 |
| JP | 10-187057 A | 7/1998 |
| JP | A 11-064789 | 3/1999 |
| JP | A 11-212050 | 8/1999 |
| JP | A 2000-162548 | 6/2000 |
| JP | A-2001-154143 | 6/2001 |
| JP | A 2001-176766 | 6/2001 |
| JP | A-2001-284240 | 10/2001 |
| WO | WO 99/39376 | 8/1999 |

OTHER PUBLICATIONS

The Optics Encyclopedia, Wiley-VCH Verlag GmbH, Published Mar. 2004, vol. 2, p. 1377.*

* cited by examiner

Primary Examiner—Georgia Y Epps
Assistant Examiner—Jerry Brooks
(74) Attorney, Agent, or Firm—Oliff & Berridge, PLC (57) ABSTRACT

A lighting device used for an image display device including a light modulator that modulates light emitted from a light source device includes: a diffractive optical element on which the light emitted from the light source device is made incident and that generates diffractive light from the light made incident thereon and lights the light modulator with the diffractive light; and a light shielding member that is arranged between the diffractive optical element and the light modulator and shields 0-th order light emitted to the light modulator.

15 Claims, 9 Drawing Sheets

LIGHTING DEVICE AND PROJECTOR

This application claims priority from Japanese Patent Application No. 2005-237271, filed in the Japanese Patent Office on Aug. 18, 2005, the entire disclosure of which is hereby incorporated by reference in its entirety.

BACKGROUND

1. Technical Field

The present invention relates to a lighting device and a projector.

2. Related Art

In recent years, an ultra-high pressure mercury lamp is often used as a light source for a projection image display device. However, because of problems such as a durable life of a lamp, impossibility of instant lighting, narrowness of a color reproducibility range, and light resistance of a liquid crystal light valve due to irradiation of light with an ultraviolet wavelength, a projector that uses a laser as a light source and lights a light modulator such as the liquid crystal light valve is proposed (see, for example, JP-A-11-64789 and JP-A-2000-162548).

A laser display device described in JP-A-11-64789 sets light emitted from laser light sources of three colors, red, green, and blue, in a uniform intensity distribution with an optical integrator. Then, the laser display device modulates light emitted from the optical integrator with a spatial light modulator to display an image. A projection display device described in JP-A-2000-162548 uses a white laser light source and separates a color of light into three colors, red, green, and blue, with a dichroic mirror. Thereafter, the projection display device spatially modulates, in respective reflection liquid crystal display panels, illumination lights in respective wavelength bands with video signals corresponding to the illumination lights to display an image.

When a predetermined optical system is used for lighting an incidence surface of a light modulator with a laser beam in a uniform illuminance distribution, depending on a structure of the optical system, it is likely that increase in size and complexity of the device or increase in cost of the device is caused. Further, depending on a structure of the optical system, it is likely that fall in light use efficiency or the like is caused. Thus, when a diffractive optical element is used as means for lighting the incidence surface in the uniform illuminance distribution, 0-th order light is generated because of a process error at the time of creation of the diffractive optical element or an error between a light source wavelength and that at the time of design (an error caused by a temperature change or the like) and a marked luminescent spot is caused in the light modulator.

SUMMARY

An advantage of some aspects of the invention is to provide a lighting device and a projector using the lighting device that can prevent a marked luminescent spot of 0-th order light from being caused and obtain uniform illumination light.

According to an aspect of the invention, there is provided a lighting device used for an image display device including a light modulator that modulates light emitted from a light source device. The lighting device includes: a diffractive optical element on which the light emitted from the light source device is made incident and that generates diffractive light from the light made incident thereon and lights the light modulator with the diffractive light; and a light shielding member that is arranged between the diffractive optical element and the light modulator and shields 0-th order light emitted to the light modulator.

In the lighting device, light emitted from the light source device is diffracted by the diffractive optical element and travels to the light modulator. In this case, since the light shielding member is arranged between the diffractive optical element and the light modulator, the 0-th order light traveling to the light modulator is shielded by the light shielding member. Therefore, it is possible to prevent a marked luminescent spot of the 0-th order light from being caused in the light modulator and obtain uniform illumination light It is preferable that the lighting device includes plural light source devices and light shielding members are arranged on optical axes of lights emitted from the light source devices in association with the plural light source devices, respectively.

In the lighting device, since the plural light source devices are provided, coherence falls. Thus, it is possible to control a speckle pattern. Further, the light shielding members are arranged in association with the plural light source devices, respectively. Thus, it is possible to control 0-th order lights emitted from the respective light source devices. Therefore, since glare of light irradiated on the light modulator is controlled, it is possible to irradiate uniform illumination light.

It is preferable that, in the diffractive optical element, a diffractive surface is formed on an incidence surface and the shielding members are formed on an emission surface.

In the lighting device, lights emitted from the light source devices are diffracted on the diffractive surface formed on the incidence surface of the diffractive optical element and travel to the emission surface. In this case, 0-th order light of light emitted from the emission surface of the diffractive optical element is shielded by the shielding members formed on the emission surface. Therefore, since the 0-th order light of the light traveling to the light modulator is controlled, it is possible to prevent a marked luminescent spot of the 0-th order light from being caused in the light modulator. Since the diffractive optical element and the light shielding members are integrally manufactured, it is possible to reduce the number of components. Thus, it is possible to reduce thickness, size, and cost of the entire device. Moreover, it is possible to form the plural light shielding members on the emission surface of the diffractive optical element according to the same process as manufacturing of a semiconductor device. Thus, it is possible to easily align the light shielding members. Therefore, since it is possible to accurately arrange the light shielding members, 0-th order light can be surely controlled.

It is preferable that the lighting device includes an optical element for angle adjustment that adjusts an emission angle of light emitted from the diffractive optical element.

In the lighting device, light emitted from the light source device and diffracted by the diffractive optical element is made incident on the optical element for angle adjustment. Light emitted from the optical element for angle adjustment changes to light with an emission angle thereof adjusted. Therefore, since a width of a light beam made incident on the light modulator depends on the optical element for angle adjustment, it is possible to efficiently lead the light emitted from the light source device to the light modulator.

It is preferable that the lighting device includes: plural light source devices; and an optical element for angle adjustment that adjusts an emission angle of light emitted from the diffractive optical element, and the light shielding member is arranged in a position where plural 0-th order lights are condensed by the optical element for angle adjustment.

In the lighting device, light emitted from the light source device and diffracted by the diffractive optical element is made incident on the optical element for angle adjustment.

Plural 0-th order lights are condensed by the optical element for angle adjustment. In this case, since the light shielding member is arranged in a position where the plural 0-th order lights are condensed, light the 0-th order lights of which controlled can be efficiently led to the light modulator. Compared with the case in which the plural light shielding members are arranged in association with the light source devices, it is possible to reduce probability of occurrence of a black spot due to a failure of the light shielding member or the like.

A projector according to another aspect of the invention includes: the lighting device; a light modulator that modulates, according to an image signal, light emitted from the lighting device; and a projecting device that projects the light modulated by the light modulator.

In the projector, light emitted from the lighting device is made incident on the light modulator. An image modulated by the light modulator is projected by the projecting device. In this case, the light emitted from the lighting device is light with a marked luminescent spot of 0-th order light controlled as described above and is uniform illumination light. Thus, it is possible to project an image with uniform brightness.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Embodiments of the invention will be hereinafter explained with reference to the accompanying drawings. In the following explanation, an XYZ orthogonal coordinate system is set as required and a positional relation among respective components is explained with reference to the XYZ orthogonal coordinate system.

First Embodiment

Figure 1:
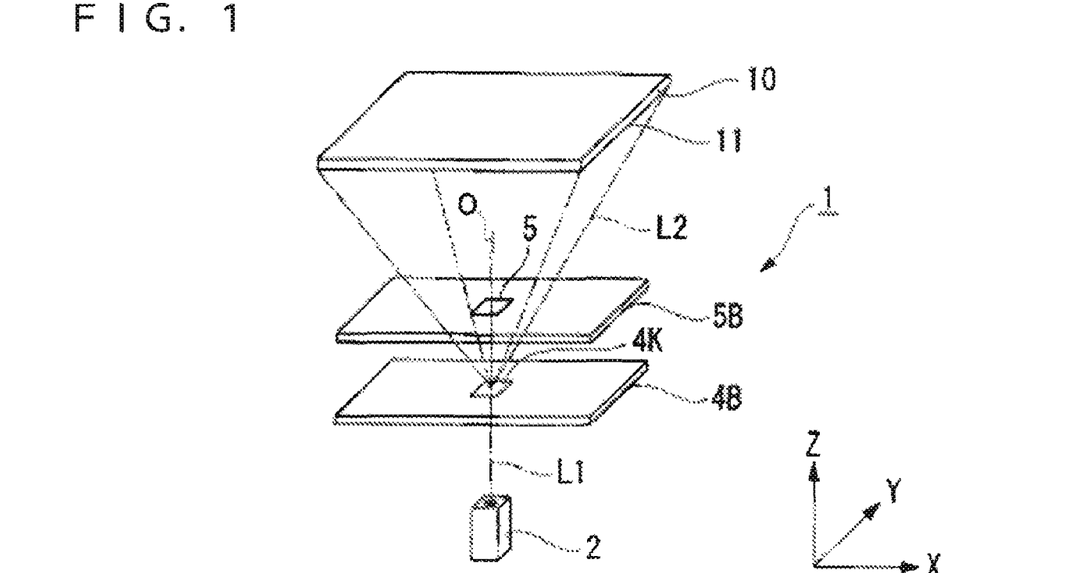
FIG. 1 is a perspective view showing a schematic structure of a lighting device according to a first embodiment of the invention.

A first embodiment of the invention will be explained. FIG. 1 is a schematic block diagram showing a lighting device according to the first embodiment. In FIG. 1, a lighting device 1 is, for example, a lighting device that lights an incidence surface 11 of a light modulator 10. The lighting device 1 includes a light source device 2 that emits a laser beam L1, a diffractive optical element 4K on which the laser beam L1 emitted from the light source device 2 is made incident and that generates diffractive light L2 with the laser beam L1 made incident thereon and lights the incidence surface 11 in a predetermined lighting area with the diffractive light L2, and a light shielding member 5 that is arranged between the diffractive optical element 4K and the light modulator 10 and shields 0-th order light emitted to the light modulator 10. The diffractive optical element 4K is supported by a support substrate 4B. The light shielding member 5 is supported by a support substrate 5B.

The laser beam L1 emitted from the light source device 2 is directly made incident on the diffractive optical element 4K. The diffractive optical element 4K generates the diffractive light L2 with the laser beam L1 irradiated by the light source device 2 and lights the incidence surface 11 of the light modulator 10 in a predetermined lighting area with the diffractive light L2. Diffractive light L2 generated by the diffractive optical element 4K is diffused light that lights a predetermined area. The diffractive optical element 4K lights the incidence surface 11 of the light modulator 10 in a predetermined lighting area with the diffused light (the diffractive light) L2 and uniformalizes illuminance in the lighting area. The diffractive optical element 4K lights the incidence surface 11 of the light modulator 10 in a lighting area larger than an emission area in which light is emitted from an emission surface of the diffractive optical element 4K. In other words, the diffractive optical element 4K is a so-called magnification system (a magnification lighting system). In this embodiment, the diffractive optical element 4K lights the incidence surface 11 of the light modulator 10 in a rectangular lighting area.

Figure 2:
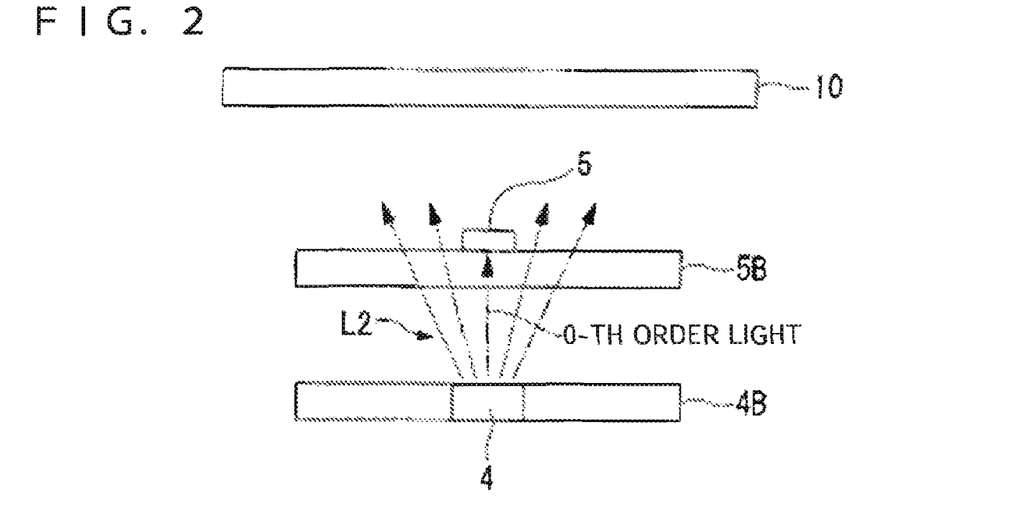
FIG. 2 is a schematic diagram for explaining an action of a light shielding member in FIG. 1.

The support substrate 5B supporting the light shielding member 5 is arranged between the diffractive optical element 4K and the light modulator 10 as shown in FIG. 1. The light shielding member 5 is arranged on an optical axis O of light emitted from the light source device 2. The support substrate 5B is made of a transparent glass substrate and transmits light made incident thereon. The light shielding member 5 is a light absorbing body that absorbs 0-th order light, which is emitted to the light modulator 10, of the diffractive light L2 diffracted by the diffractive optical element 4K as shown in FIG. 2. A size of the light shielding member 5 is a size enough for absorbing the 0-th order light. In this embodiment, a diameter of a laser beam of the light source device 2 is 0.1 mm. Thus, a diameter of the light shielding member 5 is about 0.1 mm. In the case of this structure, if the diameter of the light shielding member 5 is about 0.5 mm, the diameter does not affect the light modulator 10. As a material of the light shielding member 5, it is possible to use low-reflection chrome, resin black, and the like. Reflectance is equal to or lower than several % in each case of use of any one of the materials.

Figure 3A:
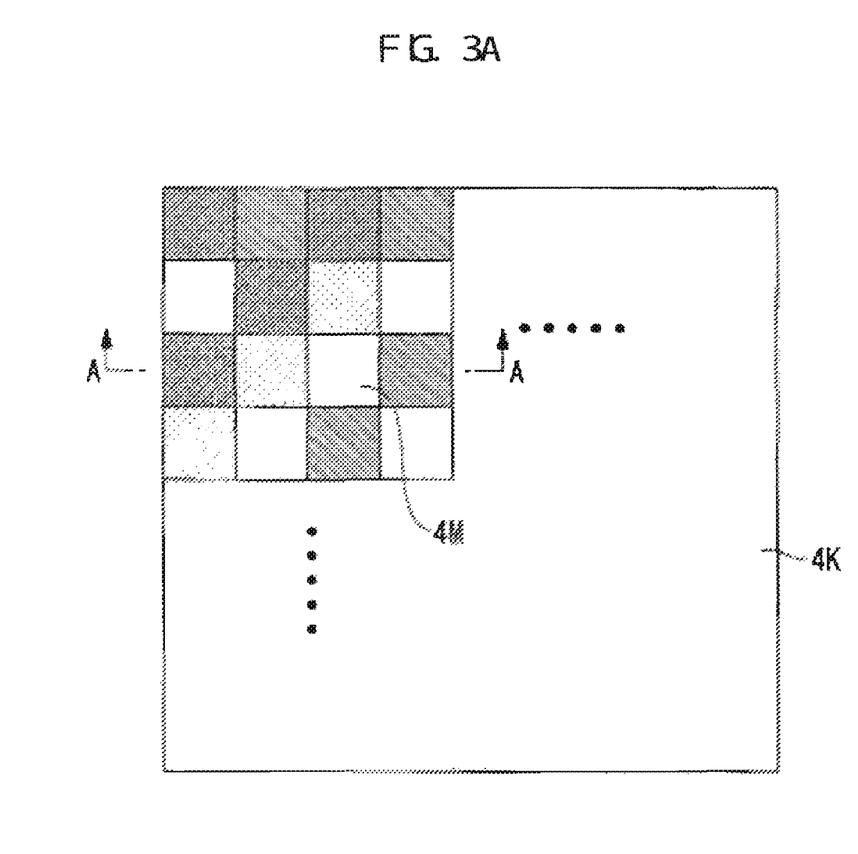
FIGS. 3A and 3B are schematic views for explaining an example of a diffractive optical element.
Figure 3B:
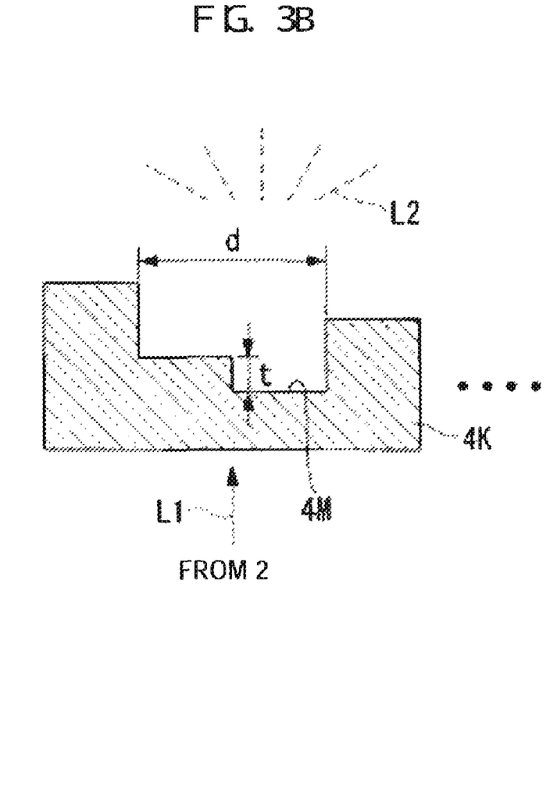

FIGS. 3A and 3B are schematic views showing an example of the diffractive optical element 4K. FIG. 3A is a plan view and FIG. 3B is a sectional arrow view along line A-A in FIG. 3A. A diffractive optical element shown in FIGS. 3A and 3B has plural rectangular recesses (uneven structures) 4M in the surface thereof. The recesses 4M have depths different from one another. Plural protrusions among the recesses 4M also have heights different from one another. It is possible to diffuse light irradiated on the diffractive optical element 4K and set a size and a shape of a lighting area by appropriately adjusting surface conditions of the diffractive optical element 4K including a pitch d among the recesses 4M and depth t of the recesses 4M (height of the protrusions). In other words, it is possible to impart a predetermined function to the diffractive optical element 4K by optimizing the surface conditions including the pitch d among the recesses 4M and the depth t of the recesses 4M. When values of the pitch d among the recesses 4M and the depth t of the recesses 4M are varied for each of plural areas on the surface of the diffractive optical element 4K, a distribution of the pitches d among the recesses 4M formed and a distribution of the depths t of the recesses 4M are also included in the surface conditions of the diffractive optical, element 4K. As a design method for optimizing the surface conditions including the pitches d among the recesses 4M and the depths t of the recesses 4M, for example, there is a predetermined arithmetic operation method (a simulation method) such as an iterative Fourier method. It is possible to form the diffractive optical element 4K having a desired function by optimizing the surface conditions of the diffractive optical element 4K.

Figure 4A:
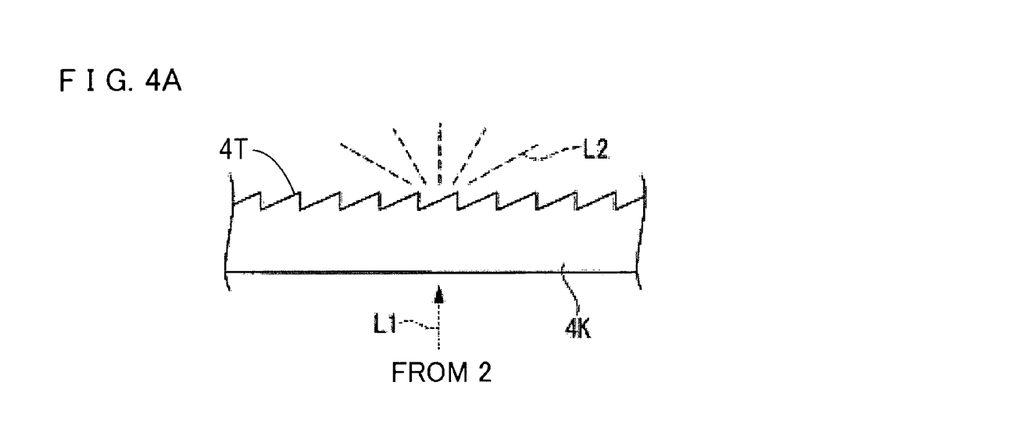
FIGS. 4A and 4B are schematic views for explaining two examples of the diffractive optical element.
Figure 4B:
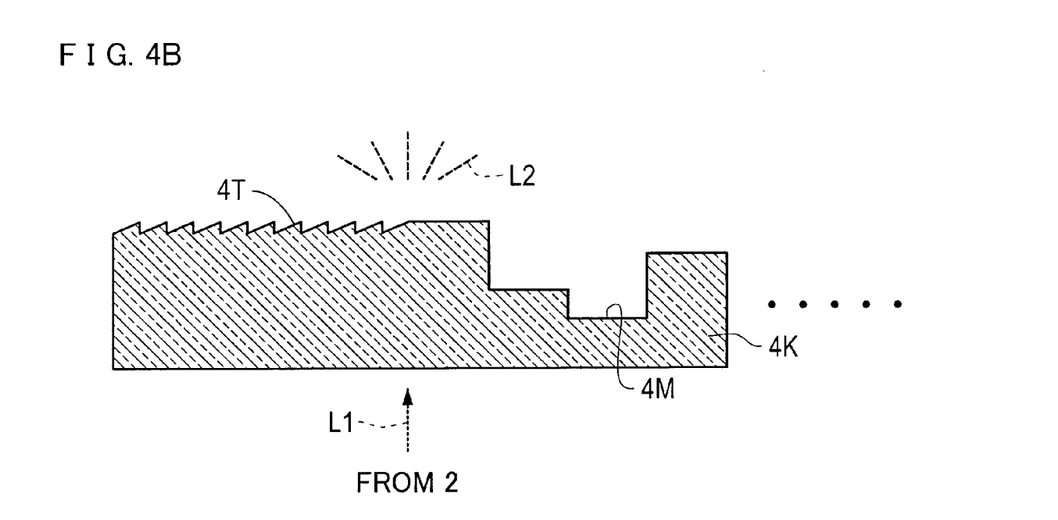

The diffractive optical element 4K is not limited to a diffractive optical element that has the rectangular recesses 4M and may be a diffractive optical element that has a surface obtained by combining planes facing directions different from one another. For example, as shown in FIG. 4A, the diffractive optical element 4K may be a diffractive optical element that has triangular recesses 4T with slopes. Further, the diffractive optical element 4K may be a diffractive optical element that has an area of the rectangular recesses shown in FIG. 3B and an area of the triangular recesses shown in FIG. 4A, or an area of the rectangular recesses 4M and an area of the triangular recesses 4T together shown in FIG. 4B. It is possible to form the diffractive optical element 4K having a desired function by optimizing the surface conditions.

Figure 5A:
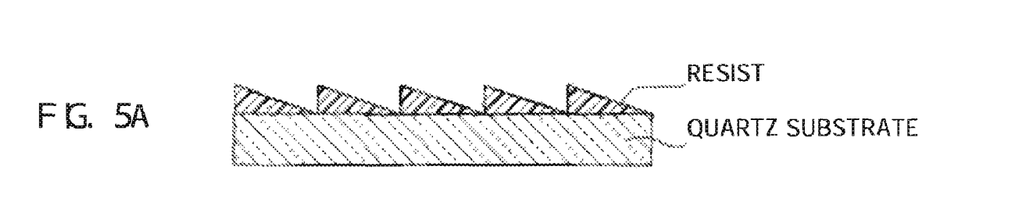
FIGS. 5A to 5D are schematic views for explaining an example of a method of manufacturing the diffractive optical element.
Figure 5B:
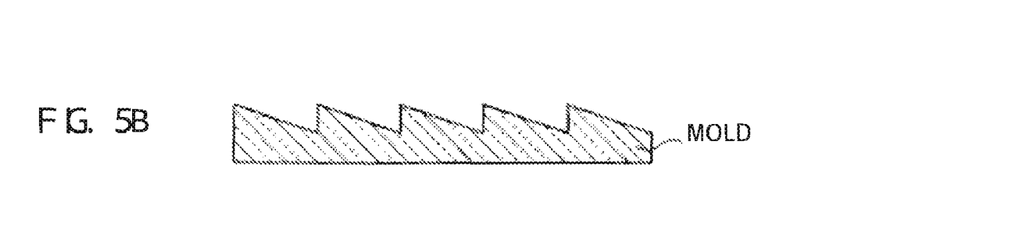
Figure 5C:
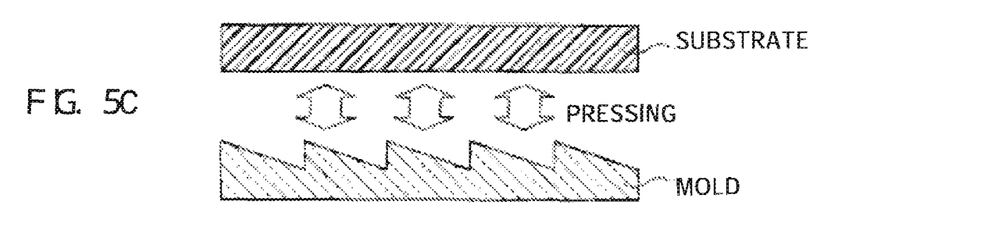
Figure 5D:
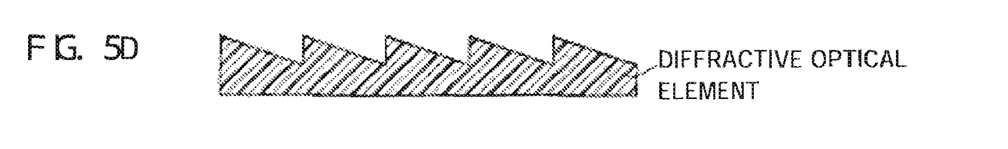

An example of a method of manufacturing the diffractive optical element 4K will be explained with reference to FIGS. 5A to 5D. As shown in FIG. 5A, after a resist is applied over a quartz substrate, an electron beam is irradiated on the resist by an electron beam rendering device and the resist is patterned. Subsequently, a mold made of quartz is formed as shown in FIG. 5B by performing etching processing. The substrate and the mold for forming a diffractive optical element such as a film-like member made of synthetic resin are heated to a temperature equal to or higher than a glass transition temperature of the substrate. As shown in FIG. 5C, the substrate and the mold are pressed against each other and held for a fixed time. Thereafter, the substrate and the mold are cooled to a temperature equal to or lower than the glass transition temperature of the substrate and separated. Consequently, a diffractive optical element made of synthetic resin having a desired shape is formed as shown in FIG. 5D. In this way, in this embodiment, a diffractive optical element is formed by a so-called nano-imprint for forming a mold and, then, thermally transferring a shape of the mold to a substrate.

The method of manufacturing a diffractive optical element explained above is an example. It is possible to use an arbitrary method as long as a diffractive optical element having a desired shape can be manufactured.

Figure 6:
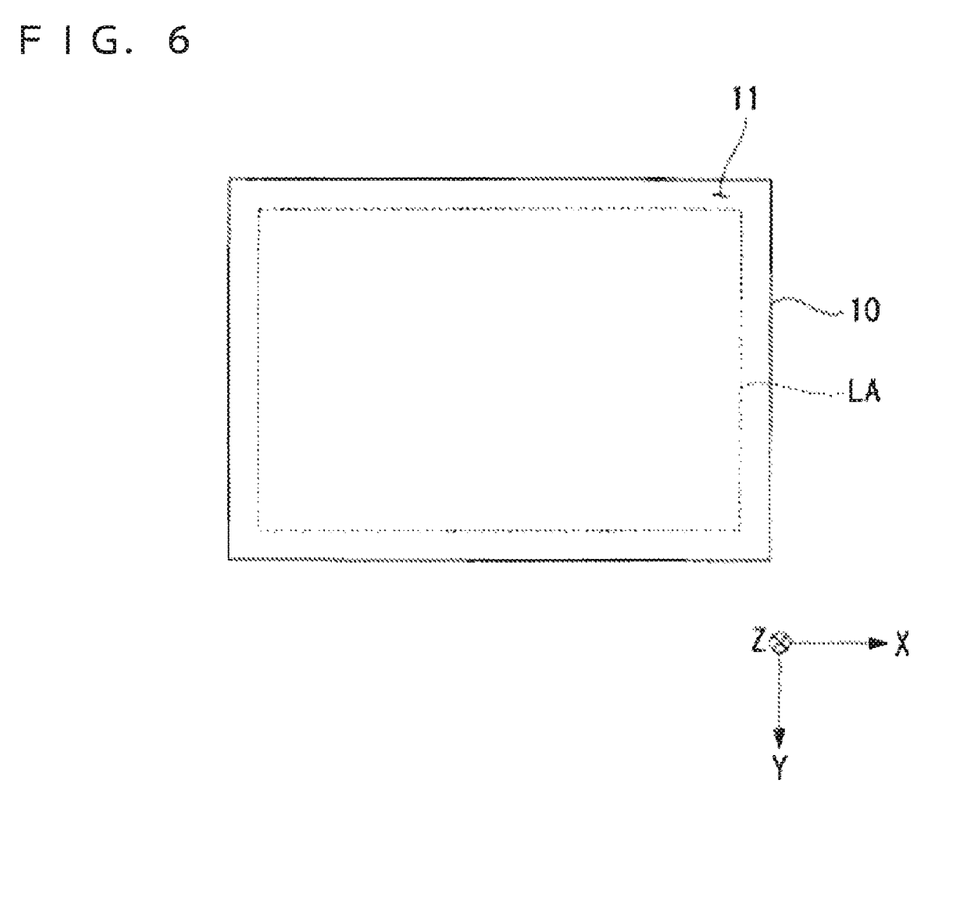
FIG. 6 is a diagram showing an incidence surface lighted by the lighting device in FIG. 1.

FIG. 6 is a schematic view showing the incidence surface 11 of the light modulator 10 lighted by the lighting device 1 including the diffractive optical element 4K. As shown in FIG. 6, the lighting device 1 including the diffractive optical element 4K can set a lighting area LA on the incidence surface 11 of the light modulator 10. Specifically, the lighting device 1 including the diffractive optical element 4K can set at least one of a size and a shape of the lighting area LA on the incidence surface 11 of the light modulator 10. In this embodiment, the lighting device 1 including the diffractive optical element 4K sets the lighting area LA in a rectangular shape. The incidence surface (including an Incidence surface of a light valve described later) 11 of the light modulator 10 in this embodiment rectangular. The lighting device 1 including the diffractive optical element 4K sets the lighting area LA corresponding to the incidence surface 11 of the light modulator 10. It is possible to set a size and a shape of the lighting area LA by appropriately adjusting the surface conditions (the pitch d among the recesses M, the depth t of the recesses 4M, etc.) of the diffractive optical element 4K. In other words, it is possible to impart a function of a lighting area setting optical system to the diffractive optical element 4K by optimizing the surface conditions including the pitch d among the recesses 4M and the depth t of the recesses 4M. By optimizing the surface conditions of the diffractive optical element 4K, it is possible to generate diffused light that can uniformalize illuminance in the lighting area LA. It is also possible to light the incidence surface 11 of the light modulator 10 in the lighting area LA larger than an emission area on which light is emitted from an emission surface of the diffractive optical element 4K. It is possible to form the diffractive optical element 4K having desired functions (a lighting area setting function, a diffused light generating function, a magnification lighting function, etc.) by optimizing the surface conditions of the diffractive optical element 4K using a predetermined method such as the iterative Fourier method mentioned above.

In other words, the diffractive optical element 4K in this embodiment has the lighting area setting function, the diffused light generating function (an illuminance equalizing function), and e magnification lighting function. The surface conditions including the pitch d among the recesses 4M and the depth t of the recesses 4M are optimized to impart the functions to the diffractive optical element 4K.

In this embodiment, the diffractive optical element 4K sets the lighting area LA in a rectangular shape. However, it is possible to set the lighting area LA in an arbitrary shape such as a line shape and a circular shape by optimizing the surface conditions including the pitch d among the recesses 4M and the depth t of the recesses 4M.

In the lighting device 1 according to this embodiment, light emitted from the light source device 10 is diffracted by the diffractive optical element 4K and travels to the light modulator 10. In this case, since the light shielding member 5 is arranged between the diffractive optical element 4K and the light modulator 10, 0-th order light traveling to the light modulator 10 is absorbed by the light shielding member 5. Therefore, it is possible to prevent a marked luminescent spot of the 0-th order light from being caused in the light modulator 10 and irradiate uniform illumination light on the light modulator 10.

Second Embodiment

A second embodiment of the invention will be explained with reference to FIG. 7. In respective embodiments explained below, components identical with those in the lighting device 1 according to the first embodiment are denoted by the identical reference numerals and signs. Explanations of the components are omitted.

A projector 20 according to this embodiment includes lighting devices 1 (1R, 1G, and 1B).

Figure 7:
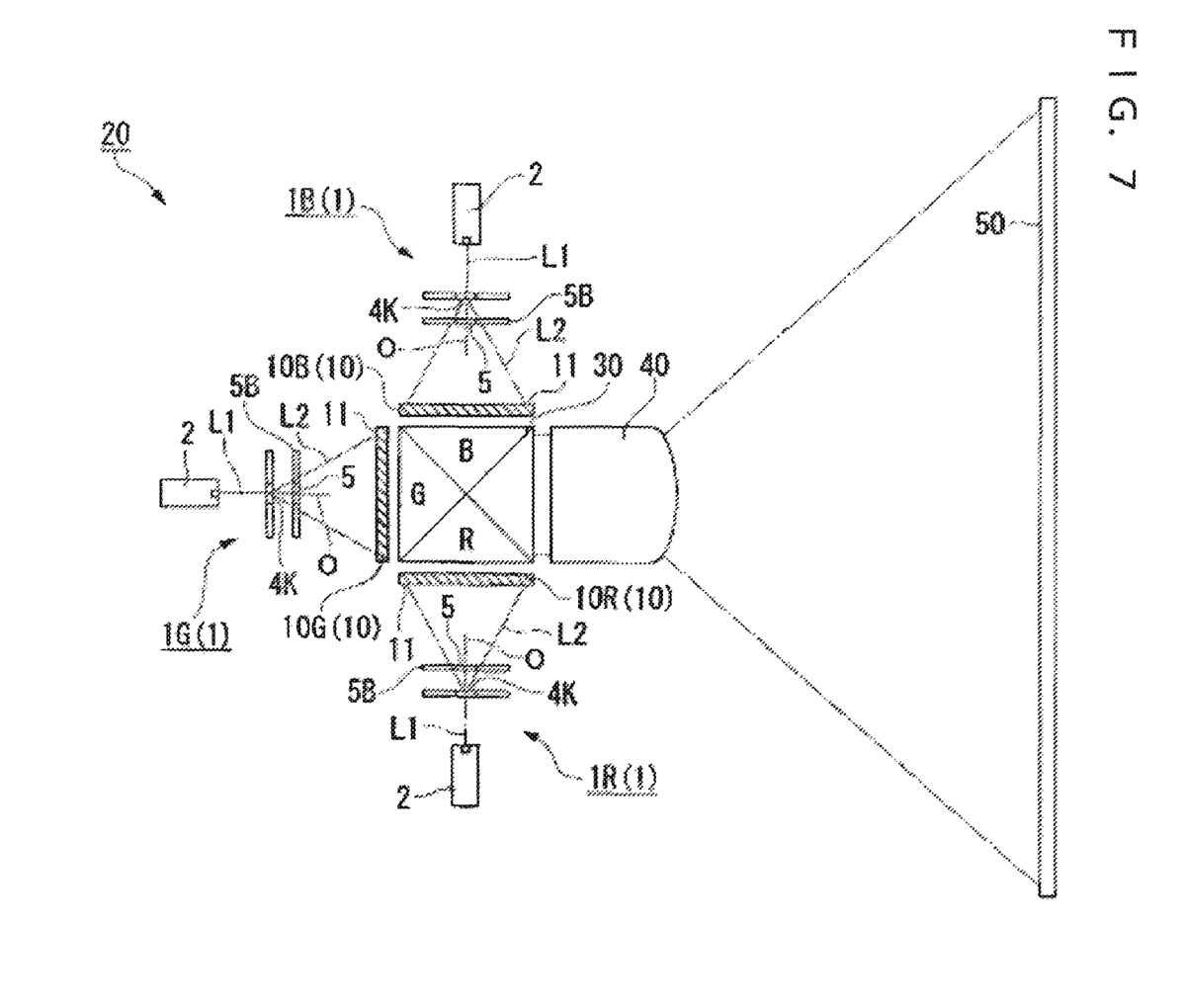
FIG. 7 is a diagram showing a schematic structure of a projector according to a second embodiment of the invention.

As shown in FIG. 7, as in the first embodiment, light shielding members 5 are arranged on optical axes O of lights emitted from light source devices 2. This makes it possible to absorb 0-th order lights emitted from the light source devices 2 with the light shielding members 5. In other words, lights emitted from the light shielding members 5 are lights with 0-th order lights controlled. A size of the light shielding members 5 is about 0.1 mm.

As shown in FIG. 7, the projector 20 is a projector of a projection type that projects color lights including image information generated by light modulators 10 on a screen 50. The projector 20 includes a lighting device for R light 1R that emits a red laser beam, a lighting device for G light 1G that emits a green laser beam, a lighting device for B light 1B that emits a blue laser beam, and an incidence surface 11 on which R light, G light, and B light emitted from the respective lighting devices 1R, 1G, and 1B are made incident. The projector 20 further includes transmission liquid crystal light valves (light modulators; hereinafter referred to as light valves) 10R, 10G, and 10B that modulate luminances of the R light, the G light, and the B light according to an image signal, a dichroic prism 30 that combines the respective color lights modulated to form a color image, and a projection lens (a projection device) 40 that projects the color image emitted from the dichroic prism 30 on the screen 50.

The light valves 10R, 10G, and 10B include incidence side sheet polarizers, panels having liquid crystal filled between a pair of glass substrates, and emission side sheet polarizers. Pixel electrodes and orientation films are provided on the glass substrates. Light valves constituting a spatial light modulator are adapted to transmit only light in a predetermined vibration direction. Basic color lights made incident on the light valves pass through the light valves to be modulated.

The lighting device for R light 1R generates diffractive light for lighting a desired area from the red laser beam with the diffractive optical element 4K and lights the incidence surface 11 of the light valve 10R with the diffractive light generated. The lighting device for G light 1G generates diffractive light for lighting a desired area from the green laser beam with the diffractive optical element 4K and lights the incidence surface 11 of the light valve 10G with the diffractive light generated. The lighting device for B light 1B generates diffractive light for lighting a desired area from the blue laser beam with the diffractive optical element 4K and lights the incidence surface 11 of the light valve 10B with the diffractive light generated.

Red light, green light, and blue light (modulated lights), which pass through the respective light valves 10R, 10G, and 10B to be modulated, are combined by the dichroic prism 30. The red light (R), the green light (G), and the blue light (B) are combined by the dichroic prism to be full-color combined light. The full-color combined light emitted from the dichroic prism 30 is emitted to the projection lens 40. The projection lens 40 projects the full-color combined light on the screen 50. The projection lens 40 is a so-called magnification system that magnifies an image on an incidence side and projects the image on the screen 50.

A method of projecting an image on the screen 50 using the projector 20 in this embodiment having the structure described above will be explained.

First, an action of the red light emitted from the lighting device for R light 1R will be explained. Actions of the green light emitted from the lighting device for G light 1G and the blue light emitted from the lighting device for B light 1B are the same as that of the red light. Thus, explanations of the actions of the green light and the blue light are omitted.

The red light emitted from the light source device 2 is made incident on the diffractive optical element 4K, diffracted, and emitted. 0-th order light of the diffractive light emitted by the diffractive optical element 4K is absorbed by the light shielding member 5. The remaining light is transmitted through the support member 5B and travels to the light valve 10R. Thereafter, the light made incident on the incidence surface 11 of the light valve 10R is modulated on the basis of a video signal inputted to the projector and emitted to the dichroic prism 30.

The R light, the G light, and the B light made incident on the dichroic prism 30 are combined by a blue light reflection dichroic film for reflecting blue light and a green light reflection dichroic film for reflecting green light, light representing a color image is formed, and the light is emitted to the projection lens 40. The projection lens 40 magnifies the light representing the color image and projects the light to the screen 50 to display the color image.

As explained above, according to this embodiment, the diffractive optical elements 4K generate diffractive lights L2 with laser beams L1 emitted from the light source devices 29 and lights the incidence surfaces 11 of the light valves 10R, 10G, and 10B with the diffractive lights L2. Thus, even if 0-th order lights are generated from the diffractive optical elements 4K, it is possible to control an increase in local illuminance (luminance) of the 0-th order lights on the incidence surface 11.

In this embodiment, the diffractive optical elements 4K are designed to prevent 0-th order lights from being generated using a predetermined method such as the iterative Fourier method and are designed to be capable of lighting the incidence surfaces 11 in a uniform illuminance distribution with primary lights generated. However, or example, it is likely that 0-th order lights are generated by the diffractive optical elements 4K because of a manufacturing error (a process error) at the time when the diffractive optical elements 4K are manufactured, a wavelength error of the laser beams L1 emitted from the light source devices 2, and the like. An error (fluctuation) of wavelengths of the laser beams L1 emitted from the light source devices 2 is caused by, for example, a temperature change. The 0-th order lights are often formed on extended lines of lights made incident on the diffractive optical elements 4K. Light intensities of the 0-th order lights are often values corresponding to intensities (illuminance) of lights made incident on the diffractive optical elements 4K. In such a case, when the laser beams L1 from the light source devices 2 are directly made incident on the diffractive optical elements 4K, it is possible that the 0-th order lights are made incident on areas of the incidence surfaces 11 on extended lines of the laser beams L1 made incident on the diffractive optical elements 4K and illuminance (luminance) of portions on which the 0-th order lights are irradiated locally increases. In the case, an image formed on the basis of the spatial light modulators 10 is defective.

However, in this embodiment, the light shielding members 5 are arranged in positions where 0-th order lights of the diffractive lights emitted from the diffractive optical elements 4K are generated, that is, on the optical axes O of the lights emitted from the light source devices 2. Thus, it is possible to absorb the 0-th order light. Therefore, an increase in local illuminance (luminance) of the lights made incident on the diffractive optical elements 4K is controlled and the lighting device 1 can light the incidence surfaces 11 substantially in a desired state. Therefore, the projector 20 having the lighting device 1 can form a desired image with the lights passing through the incidence surfaces 11.

Since laser light sources are used as the light source devices 2, it is possible to emit polarized lights. Compared with the structure in which white light sources such as high-pressure mercury lamps are used as light sources, it is possible to remove components such as polarization splitting elements (polarization beam splitters) and color separating elements (dichroic mirrors). Since laser beams (basic color lights) in a narrow wavelength band are emitted, when an image is displayed using the laser beams, it is possible to obtain satisfactory color reproducibility. Further, since ultraviolet lights are not irradiated on the liquid crystal devices (the light valves), it is also possible to control deterioration in the light valves.

As explained with reference to FIGS. 5A to 5D and the like, it is possible to manufacture the diffractive optical elements 4K according to the nano-imprint method. Thus, it is possible to easily manufacture a large quantity of diffractive optical elements and reduce manufacturing cost.

Third Embodiment

A third embodiment of the invention will be explained with reference to FIGS. 8 to 10.

A projector 60 according to this embodiment is different from the projector according to the second embodiment in that lighting devices 61R, 61G, and 61B include plural light source devices 2, respectively.

Figure 8:
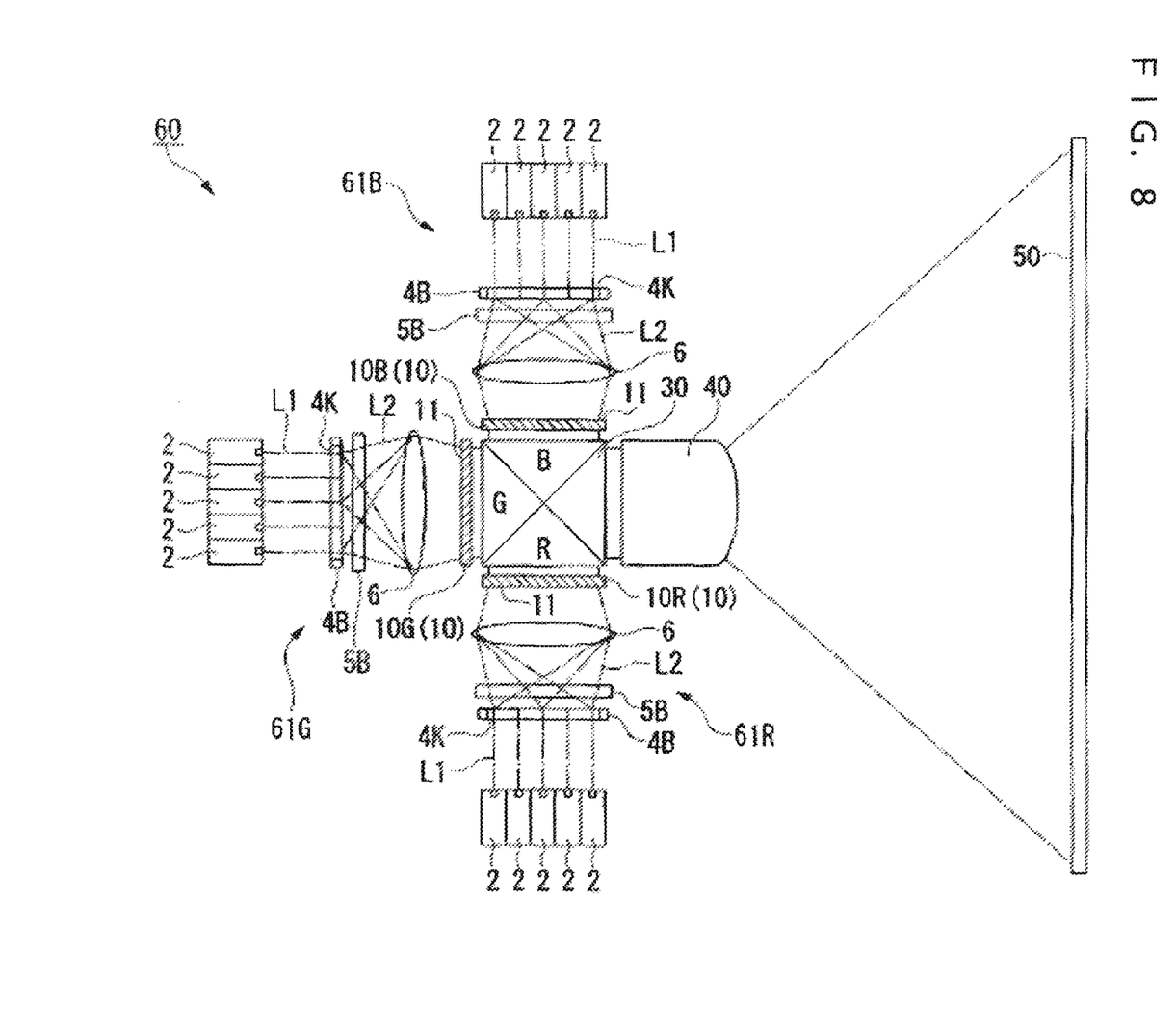
FIG. 8 is a diagram showing a schematic structure of a projector according to a third embodiment of the invention.
Figure 9:
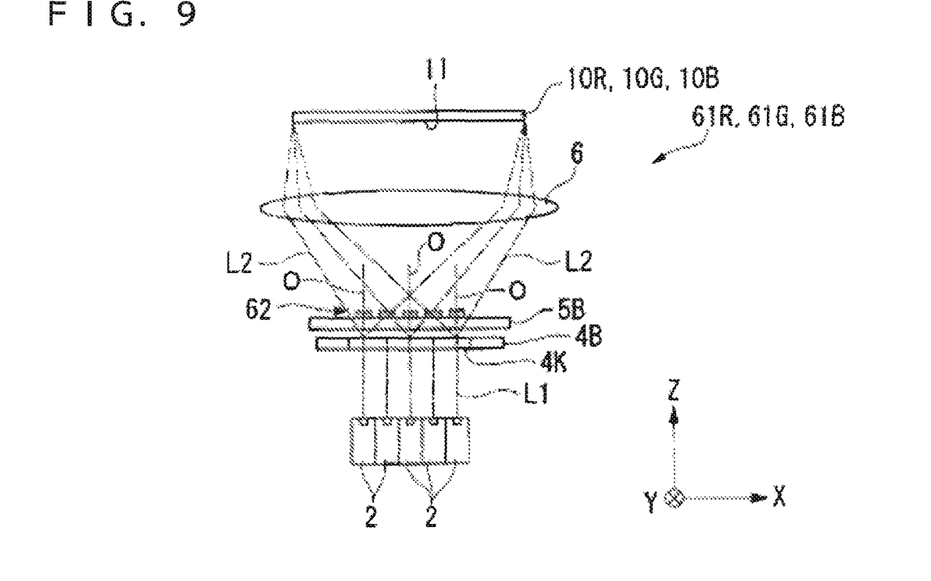
FIG. 9 is a diagram showing a schematic structure of a lighting device in FIG. 8.

As shown In FIG. 8, the plural light source devices 2 are arranged in an array shape in the projector 60 as shown in FIG. 8. In this embodiment, as shown in FIG. 9, the plural light source devices 2 are provided to be arranged in a one-dimensional direction an X direction). Light emitting surfaces of the light source devices 2 face a +Z side and the respective light source devices 2 emit the laser beams L1 in a +Z direction.

Plural light shielding members 62 are provided in association with the plural light source devices 2. As shown in FIG. 9, the light shielding members 62 are arranged on optical paths O of lights emitted from the plural light source devices 2, respectively. This makes it possible to absorb 0-th order lights emitted from the respective light source devices 2 with the light shielding members 62 corresponding thereto. In other words, lights emitted from the light shielding members 62 are lights the 0-th order lights of which controlled. A size of the light shielding members 62 is about 0.1 mm.

Moreover, optical elements for angle adjustment 6 are provided between the diffractive optical elements 4K and the incidence surfaces 11 of the light valves 10R, 10G, and 10B. As shown in FIG. 9, diffractive lights (primary lights) L2 from the diffractive optical element 5 are irradiated on the optical elements for angle adjustment 6. The optical elements for angle adjustment 6 have an angle adjustment function for adjusting an emission angle of light emitted. The optical elements for angle adjustment 6 are constituted by refractive lenses (field lenses). The refractive lenses include an axially symmetrical lens, which is rotationally symmetrical to an optical axis, such as a spherical lens or an aspherical lens. Alternatively, the optical elements for angle adjustment 6 may be lenses including a Fresnel lens or the like. The optical elements for angle adjustment 6 are capable of adjusting an emission angle of lights irradiated from the diffractive optical elements 4K, that is, an incidence angle of lights with respect to the incidence surface 11 of the light valves 10R, 10G, and 10B. In this embodiment, the optical elements for angle adjustment 6 are optimized to be capable of adjusting an emission angle of light emitted such that predetermined areas on the incidence surfaces 11 are lighted in a superimposing manner by the diffractive lights (the primary lights) 12 generated by the diffractive optical elements 4K on the basis of the plural laser beams L1 emitted from the plural light source devices 2.

A method of manufacturing the light shielding members 62 will be explained.

Figure 10A:
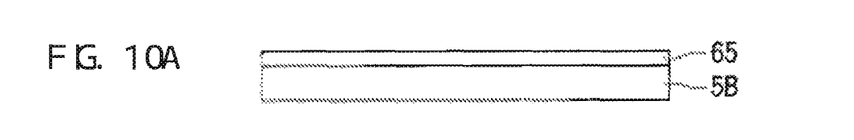
FIGS. 10A to 10D are schematic views for explaining an example of a method of manufacturing a light shielding member in FIG. 8.

First, as shown in FIG. 10A, the support substrate 5B consisting of a glass substrate is prepared. A low-reflection chrome 65 serving as a light absorbing material is formed on he surface of the support substrate 5B using the sputtering or the vacuum evaporation. Subsequently, the support substrate 5B with the low-reflection chrome 65 formed is processed using the photolithography. First, a photoresist (a negative type or a positive type) 66 such as an ultraviolet ray reactive resist is applied over the film of the low-reflection chrome 65 to form a resist layer. In a state in which a photo-mask (not shown) of a predetermined shape is set on this resist layer, the photoresist layer is exposed to light using a light source of an ultraviolet light or the like. In this embodiment, a negative photoresist is used.

Figure 10B:
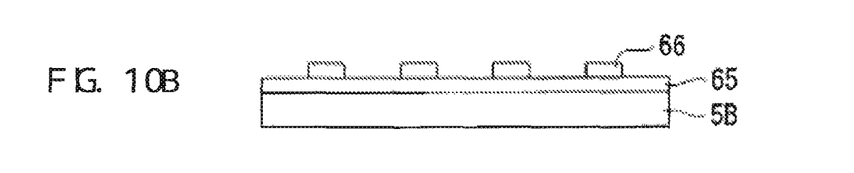

After the exposure process ends, development processing is performed. Since the negative photoresist 66 has a characteristic that the negative photoresist 66 dissolves in a solvent, the resist layer on which light is irradiated by a photochemical reaction becomes insoluble in the solvent and remains as shown in FIG. 10B.

Figure 10C:
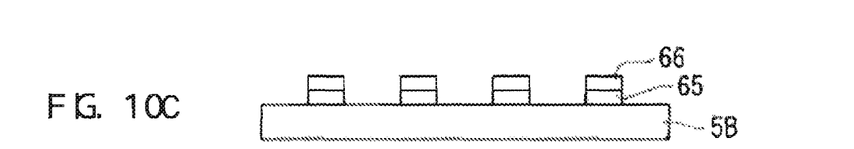
Figure 10D:
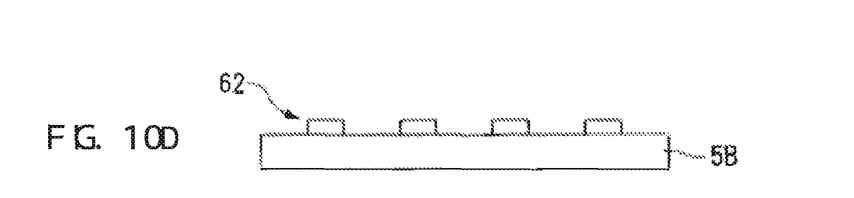

Moreover, after etching is applied to the support substrate 5B, on which a desired pattern of the photo-resist 66 is formed, as shown in FIG. 10C, the photoresist 66 is peeled off and the low-reflection chrome 62 of a desired shape is formed on the support substrate 5B as shown in FIG. 10D.

Since the lighting devices 61R, 61G, and 61B according to this embodiment include the plural light source devices 2, it is possible to control generation of a speckle pattern. The speckle pattern is a spot-like pattern with high contrast that is generated in a space when a rough surface or a scattering surface including an inhomogeneous medium is irradiated by coherent light like a laser beam and scattered lights diffused lights) of the coherent light is observed. The scattered lights (the diffused lights) generated at respective points of the scattering surface interfere with one another in a random phase relation. As a result, it is likely that the scattered lights generate a complicated interference pattern and light the incidence surfaces 11 of the light valves 10R, 10G, and 10B in a non-uniform illuminance distribution. In this embodiment, since the lighting devices 61R, 61G, and 61B include the plural light source devices 2 and laser beams emitted from the plural light source devices 2 are incoherent to one another, the incidence surfaces 11 of the light valves 10R, 10G, and 10B are lighted by lights having illuminance distributions (luminance distributions) different from one another. Thus, it is possible to reduce an apparent speckle pattern and substantially uniformalize illuminance distributions on the incidence surfaces 11 of the light valves 10R, 10G, and 10B by superimposing diffused lights based on the laser beams one on top of another on the incidence surfaces 11 of the light valves 10R, 10G, and 10B. Therefore, the projector 60 can display an image in which luminance unevenness (illuminance unevenness) is controlled.

Since the light shielding members 62 are as small as about 0.1 mm, when diffractive lights of beams passing around the light shielding members 62 are irradiated on the light valves 10R, 10G, and 10B, the diffractive lights are lights in which black spots caused by the light shielding members 62 are controlled. Therefore, it is possible to project a clearer image on the screen 50.

Since the optical elements for angle adjustment 6 are provided, it is possible to set an incidence angle of lights with respect to the incidence surfaces 11 of the light valves 10R, 10G, and 10B small and it is possible to efficiently light the incidence surfaces 11 of the light valves 10R, 10G, and 10B. It is also possible to light predetermined areas on the incidence surfaces 11 of the light valves 10R, 10G, and 10B in a superimposing manner with the diffractive lights L2 generated by the diffractive optical elements 4K on the basis of the laser beams L1 emitted from the plural light source devices 2. This makes it possible to efficiently light the incidence surfaces 11 of the light valves 10R, 10G, and 10B at high illuminance. It is also possible to control occurrence of a speckle pattern and light the incidence surfaces 11 of the light valves 10R, 10G, and 10B in a substantially uniform illuminance distribution.

Moreover, it is possible to form the plural light shielding members 62 on the support substrates 5B according to the same process as manufacturing of a semiconductor device. Thus, it is possible to accurately arrange the light shielding members 62 and it is possible to surely control 0-th order lights.

Fourth Embodiment

A fourth embodiment of the invention will be explained with reference to FIG. 11.

In a projector according to this embodiment, a shape of a diffractive optical element 72 used in lighting devices 71R, 71G, and 71B is different from that in the third embodiment.

Figure 11:
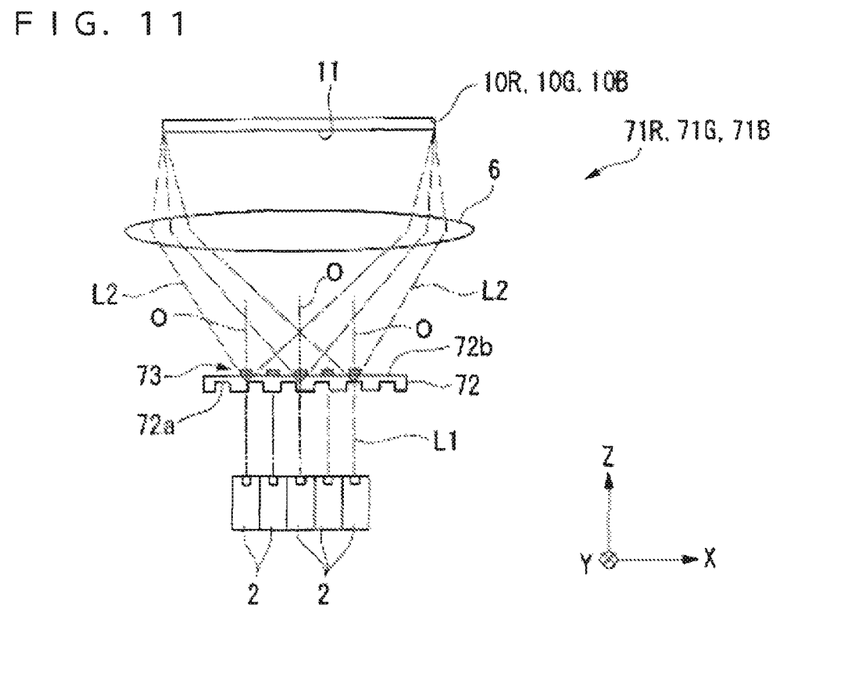
FIG. 11 is a diagram showing a schematic structure of a lighting device according to a fourth embodiment of the invention.

As shown in FIG. 11, in the diffractive optical element 79, a diffractive surface is formed on an incidence surface 72a and light shielding members 73 are formed on an emission surface 72b. Like the diffractive optical element 4K shown in FIGS. 3A and 3B, the diffractive surface formed on the incidence surface 72a is a diffractive optical element that irradiates light on a predetermined area. The light shielding members 73 formed on the emission surface 72b are arranged on optical axes O of lights emitted from the plural light source devices 2.

With such a structure, the laser beams L1 irradiated by the light source devices 2 are diffracted on the incidence surface 72a of the diffractive optical element 72. 0-th order lights of the diffractive light L2 diffracted are shielded by the light shielding members 73 formed on the emission surface 72b. An angle of incidence on the light valves 10R, 10G, and 10B of the diffractive lights L2 emitted from the emission surface 72b is adjusted by the optical elements for angle adjustment 6. The diffractive lights L2 light predetermined lighting areas of the incidence surfaces 11 of the light valves 10R, 10G, and 10B. The diffractive lights L2 generated by the diffractive optical element 4K are diffused lights that light the predetermined areas. The diffractive optical element 4K lights the incidence surfaces 11 of the light valves 10R, 10G, and 10B in the predetermined lighting areas with the diffused lights (the diffractive lights) 12 and uniformalize illuminance in the lighting areas.

In thee lighting devices 71R, 71G, and 71B according to this embodiment, 0-th order lights of lights irradiated on the incidence surfaces 11 of the light valves 10R, 10G, and 10B are controlled. Thus, it is possible to prevent a marked luminescent spot of the 0-th order lights from being caused on the incidence surfaces 11 of the light valves 10R, 10G, and 10B. Since the light shielding members 73 are formed on and integrally manufactured with the diffractive optical element 72, it is possible to reduce the number of components. Thus, it is possible to reduce thickness, size, and cost of the entire device. Therefore, by applying the lighting devices 71R, 71G and 71B of the invention to a projector, it is possible to display an image in which luminance unevenness (illuminance unevenness) is controlled.

Moreover, it is possible to form the plural light shielding members 73 on the emission surface 72b of the diffractive optical element 72 according to the same process as manufacturing of a semiconductor device Thus, it is possible to easily align the light shielding members 73. Therefore, since it is possible to accurately arrange the light shielding members 73, it is possible to surely control 0-th order lights.

Fifth Embodiment

A fifth embodiment or the invention will be explained with reference to FIG. 12.

In a projector according to this embodiment, a shape of a light shielding member 82 used in lighting devices 81R, 81G, and 81B are different from that in the third embodiment.

Figure 12:
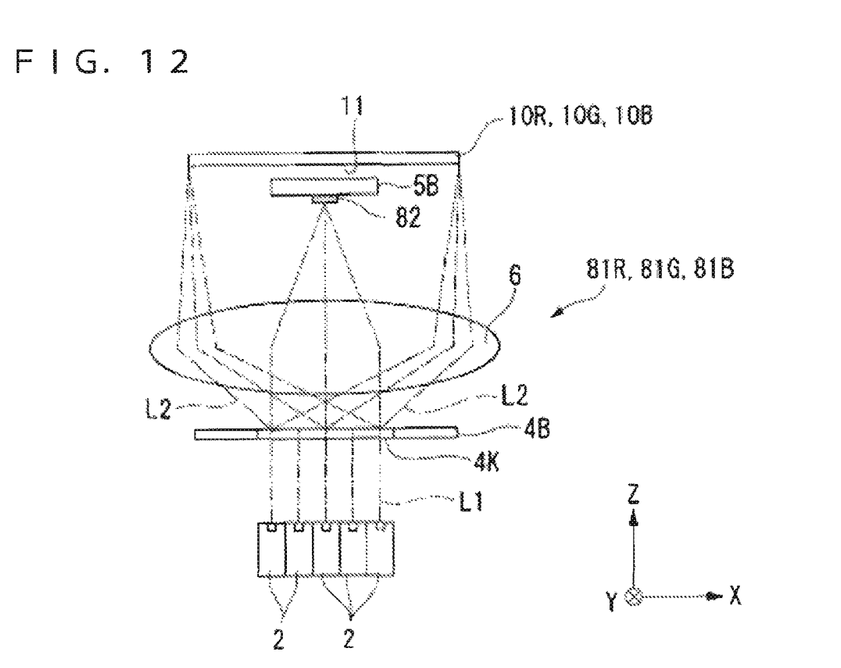
FIG. 12 is a diagram showing a schematic structure of a lighting device according to a fifth embodiment of the invention.

As shown in FIG. 12, the light shielding member 82 is arranged in a position where plural 0-th order lights are condensed by the optical element for angle adjustment 6. In other words, after the diffractive lights L2 emitted from the diffractive optical element 4K are made incident on the optical element for angle adjustment 6, the light shielding member 82 absorbs the 0-th order lights condensed by the optical element for angle adjustment 6.

In the lighting devices 81R, 81G and 81B according to this embodiment, the light shielding member 82 is arranged in a position where 0-th order lights are condensed. Thus, it is possible to efficiently lead the diffractive lights L2 the 0-th order lights in which are controlled to the incidence surfaces 11 of the light valves 10R, 10G, and 10B. Compared with a case in which plural light-shielding members 82 are arranged, it is possible to reduce probability of occurrence of a black spot due to failure of the light shielding member 82 or the like. Therefore, by applying the lighting devices 81R, 81G, and 81B of the invention to a projector, it is possible to display an image in which luminance unevenness (illuminance unevenness is controlled.

A technical scope of the invention is not limited to the embodiments. Various modifications of the invention are possible without departing from the sprit of the invention.

For example, the light absorbing member is used as the light shielding member. However, any light shielding member may be used as long as the light shielding member shields 0-th order light emitted to the light modulator 10. In other words, 0-th order lights of the diffractive lights L2 traveling to the light modulator 10 may be shielded using a member that diffuses and reflects the 0-th order lights other than the member that absorbs the 0-th order lights.

In the embodiments, the transmission liquid crystal display device is used as the light modulator. However, it is also possible to use a reflection liquid crystal display device, a digital micromirror device, and the like. It is also possible to apply the lighting devices in the respective embodiments to, other than the projection display device such as the projector mentioned above, a direct vision display device not including a projection mentioned above lens.

What is claimed is:

1. A lighting device used for an image display device, the image display device including a light source and a light modulator that modulates light emitted from the light source, the lighting device comprising:

a diffractive optical element disposed to diffract light emitted from the light source and to provide the diffracted light to the light modulator, the emitted light being substantially perpendicular to a major surface of the diffractive optical element, and a light shielding member disposed between the diffractive optical element and the light modulator so as to shield the light modulator from light emitted from the light source and not substantially diffracted by the diffractive optical element, the light source being a laser.

2. The lighting device according to claim 1, further comprising at least one other light source and at least one other light shielding member, each of the light shielding members being disposed on an optical axis of light emitted from one of the light sources.

3. The lighting device according to claim 1, the diffractive optical element defining a diffractive surface formed on an incidence surface, and the light shielding member being formed on an emission surface.

4. The lighting device according to claim 1, further comprising an optical element that adjusts an emission angle of light emitted from the diffractive optical element.

5. The lighting device according to claim 1, further comprising:

at least one other light source; and an optical element that adjusts an emission angle of light emitted from the diffractive optical element, the light shielding member being disposed so that multiple light beams not substantially diffracted by the diffractive optical element are condensed by the optical element for angle adjustment.

6. A projector, comprising:

the lighting device according to claim 1;

a light modulator that modulates, according to an image signal, light emitted from the lighting device; and a projecting device that projects the light modulated by the light modulator.

7. The lighting device according to claim 1, further comprising a first substrate that supports the diffractive optical element, and a second substrate that supports the light shielding member.

8. The lighting device according to claim 1, the diffractive optical element being disposed so as to substantially uniformalize illuminance of a lighting area of an incidence surface of the light modulator.

9. The lighting device according to claim 8, the lighting area of the incidence surface of the light modulator being larger than an emission surface of the diffractive optical element.

10. The light device according to claim 7, the second substrate being made of transparent glass that transmits light incident thereon.

11. The lighting device according to claim 1, the diffractive optical element defining multiple rectangular recesses.

12. The lighting device according to claim 11, the multiple rectangular recesses having different depths.

13. The lighting device according to claim 1, the diffractive optical element defining multiple triangular recesses.

14. The lighting device according to claim 1, the diffractive optical element defining multiple rectangular recesses and multiple triangular recesses.

15. An image display device, comprising:

a light source that emits light;

a light modulator that modulates light received in a lighting area on an incidence surface;

a diffractive optical element that diffracts light received from the light source to substantially uniformalize illuminance of the lighting area of the light modulator, the emitted light being substantially perpendicular to a major surface of the diffractive optical element; and a light shielding member disposed to shield the light modulator from light not substantially diffracted by the diffractive optical element, the light source being a laser.

* * * * *